Dec. 7, 1943.　　F. R. KLAUS, SR　　2,335,946
RETRACTABLE SUPPORT FOR TRAILERS
Filed May 29, 1942　　2 Sheets-Sheet 1
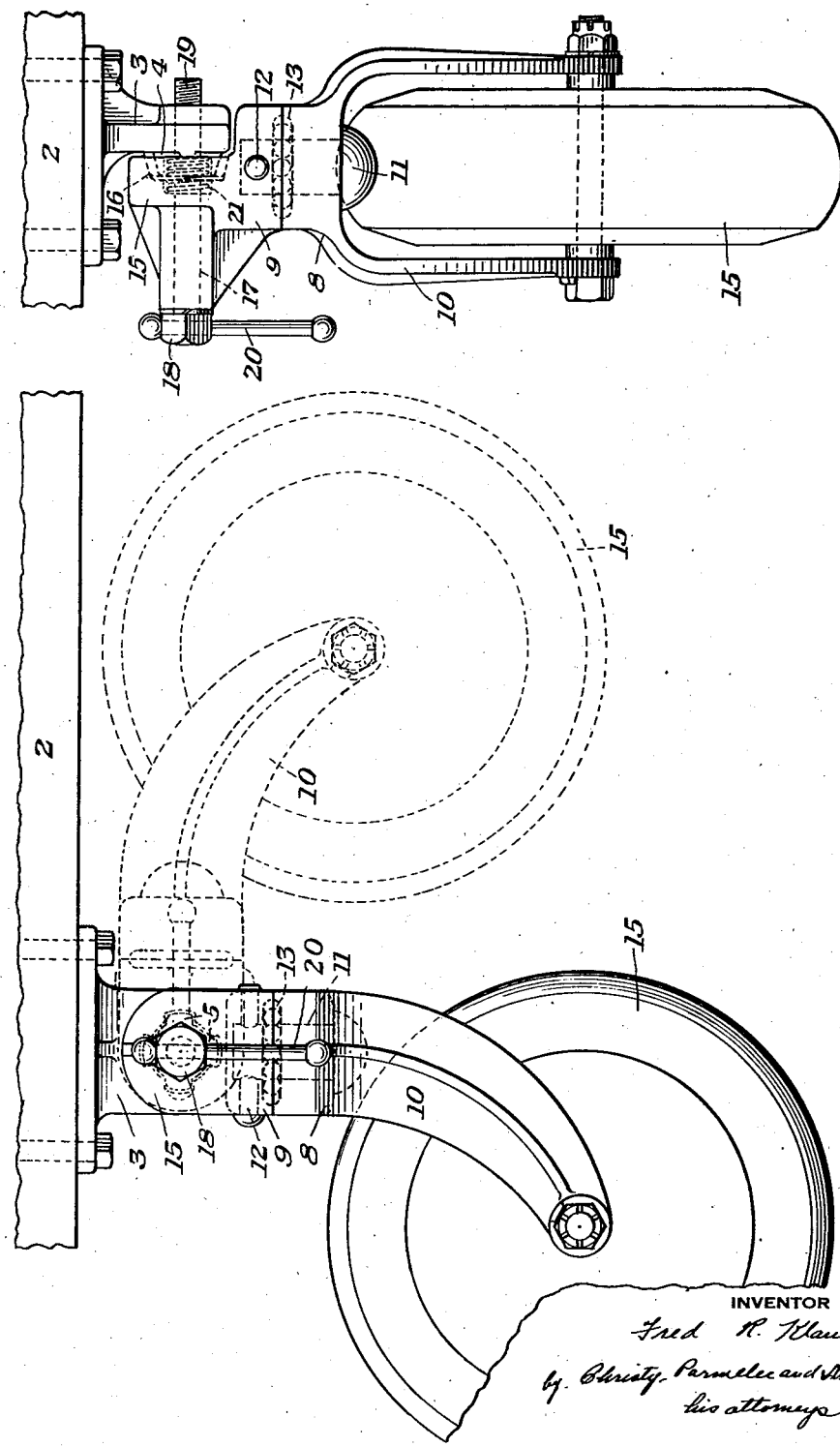
INVENTOR
Fred R. Klaus, Sr.
by Christy, Parmelee and Strickland
his attorneys

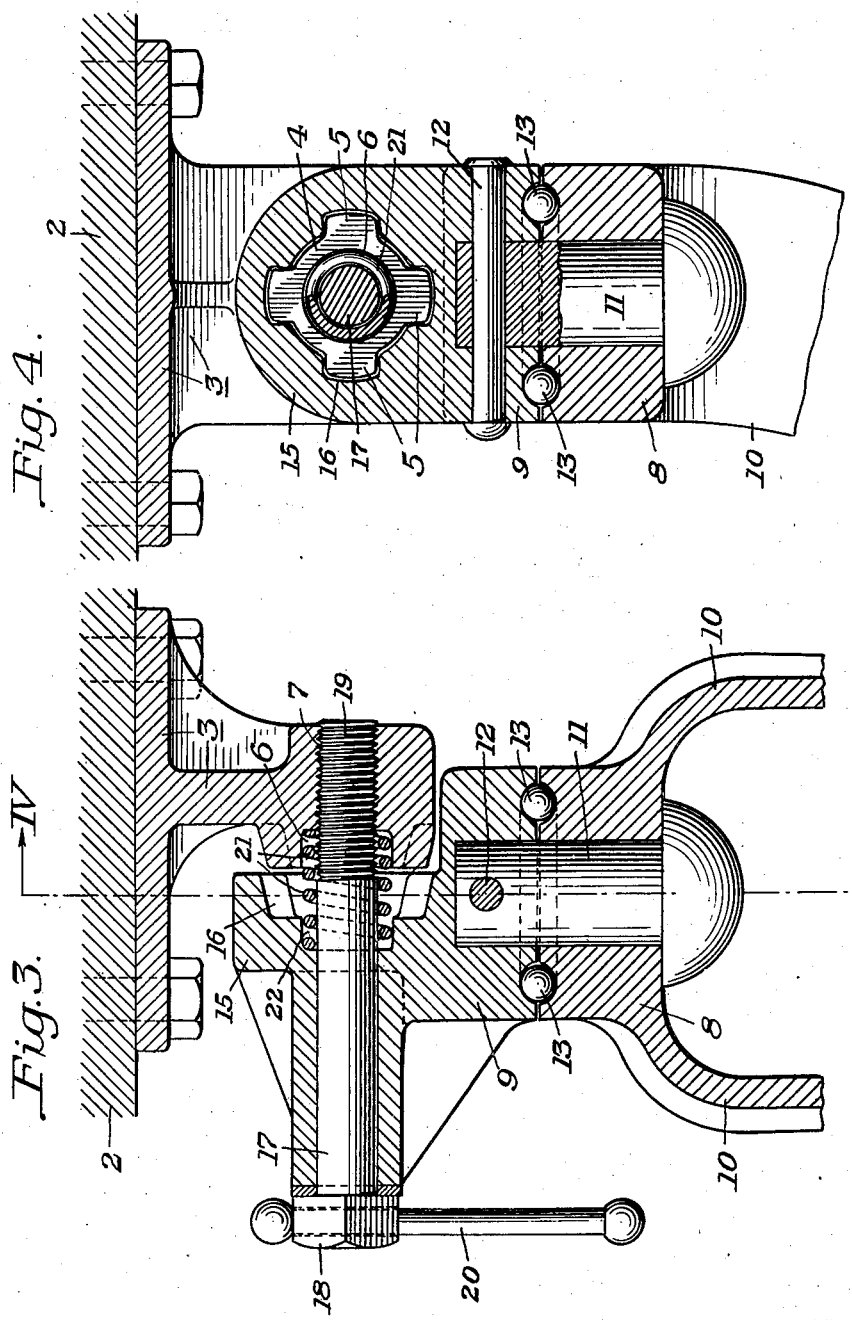

Patented Dec. 7, 1943

2,335,946

UNITED STATES PATENT OFFICE 2,335,946

RETRACTABLE SUPPORT FOR TRAILERS

Fred R. Klaus, Sr., Cleveland Heights, Ohio, assignor to The Eastern Malleable Iron Company, Naugatuck, Conn., a corporation of Connecticut Application May 29, 1942, Serial No. 444,941

5 Claims. (Cl. 280—33.4)

This invention pertains to trailers such as are towed by motor vehicles, and is for a retractable wheeled support for the front end of two-wheeled trailers.

Two-wheeled trailers are extensively used in the transportation of freight and various commodities. In transit, the front end of these trailers is supported by a towing vehicle, but at destination, a support, usually attached to the trailers, is brought into operation and the towing vehicle is disconnected. Supports of the type heretofore commonly used for this purpose have permitted the use of only relatively small wheels, whereas the present invention is designed to provide a support in which there is a wheel of generous proportions, and this is quite desirable. The present invention furthermore provides a support which enables the wheel to be quickly and easily moved to a retracted position when the support is not required, as when the trailer is attached to the towing vehicle, and which, with equal facility, permits the wheel to be moved from the retracted to the operative position. The invention further provides a support of rugged and simple construction.

My invention may be readily understood by reference to the accompanying drawings, in which Figure 1 is a side elevation of the complete assembly attached to the bottom of the trailer, only a portion of the trailer being shown.

Figure 2 is a rear elevation of the assembly shown in Figure 1.

Figure 3 is a transverse section on a larger scale than Figure 1 through the joint between the bracket and fork members of the assembly; and Figure 4 is a section in substantially the line of plane IV—IV of Figure 3.

In the drawings, 2 designates a portion of the front of a two-wheeled trailer of any known or preferred construction. Secured to the under side of the trailer 2 is a heavy bracket 3. On the one face of the bracket is a heavy boss 4 which has splines or projections or other key-forming elements 5 on the periphery thereof. In Figure 4 the boss is illustrated as being of a crenelated contour having four projections 5. In the center of the boss is a recess or well 6, and extending through the bracket centrally of the boss is a threaded hole 7.

For cooperation with the bracket 3 there is a fork member designated generally as 8 and which has an upper part 9 to which the lower part 10, comprising a swivel fork, is pivotally attached by means of a pin 11, this pin being held in place by a cross pin or rivet 12 that passes through the upper end of it, and which also passes through the member 9. A series of balls 13 is interposed between the top of the swivel fork and the bottom of the upper member 9 to provide a ball bearing. The fork has two spaced apart downwardly and forwardly curved arms, and it carries at the lower end of said arms a wheel 15 which may be of generous size and substantially larger than the wheels, which may be used on brackets for this purpose as heretofore constructed.

The upper part 9 on the fork member assembly has a part 15 in which is formed a socket 16 of a shape and size to receive or mate with the boss 4 on the bracket. Mounted in the part 15, so as to pass centrally through the socket 16, is a bolt 17 having a head 18. The threaded portion 19 of the bolt is threaded into the hole 7 in the bracket. Slidably carried in the head 18 of the bolt is an operating handle 20.

Surrounding the bolt 17, and interposed between the bracket and fork members, is a heavy coil spring 21. One end of this coil spring is received in the well 6 in the face of the boss, and the other end of the spring is received in a similar well 22, formed concentrically in the bottom of the socket 16.

In Figure 3, the fork and bracket members are shown separated. When they are separated in this way, the fork may be moved from the full line position shown in Figure 1, to the dotted line position, or from the dotted line position to the full line position, the dotted line position being the inoperative or retracted position. In order to lock the fork in either position, the handle 20 is turned to turn the bolt 17, and thereby cause the threads 19 on the screw to move the fork member toward the bracket member and the cooperating keys 5 cooperating with mating socket 16 in the fork member will come into interlocking engagement. As the parts move together, the spring 21 is compressed. The screw 17 is turned until the parts are tightly inter-engaged and until the bolt can turn no more. When the parts are so inter-engaged, the fork member cannot move sideways nor can it be rotated from one position to the other. The joint becomes an absolutely rigid connection and the support will rigidly carry the load which is placed upon it. When it is desired to move the support from one position to the other, the bolt 17 is loosened and the spring 21 serves to separate the fork member from engagement with the boss. The keys are located at 90° positions so that the fork member may be locked in either a horizontal or vertical position.

The support as thus constructed is simple, cheap and rugged. It permits the wheel 15 to be of substantial diameter, which is a highly desirable feature, and the support can be conveniently moved from one position to the other. It will be understood, of course, that at the time the support is moved from one position to the other, the front end 2 of the trailer to which the support is attached, will be supported on the towing vehicle and the wheel 15, even if the fork be in the depending position, will be clear of the ground, so that the spring 21 will be free to act to effect a relative lateral movement between the fork member and the bracket. While I have illustrated and described one specific embodiment of my invention, it will be understood that various changes and modifications may be made in the particular construction and arrangement of parts within the contemplation of my invention and under the scope of the following claims.

I claim:

1. For use on a motor vehicle trailer, a wheeled support adapted for attachment to the forward portion of the trailer, said support comprising a bracket member for mounting on the trailer and a fork member on the bracket, the fork having a wheel mounted thereon, the bracket and fork members being connected through a joint whereby the fork may be moved from a vertical to a horizontal position, there being laterally disposed interfitting stud and socket portions on the two members for locking them in either position, and a bolt forming a pivot pin for the joint engaging both members and threaded into one of them for moving one of the members laterally with respect to the other to release or engage said interfitting portions.

2. For use on a motor vehicle trailer, a wheeled support adapted for attachment to the forward portion of the trailer, said support comprising a bracket member for mounting on the trailer and fork member on the bracket, the fork having a wheel mounted thereon, the bracket and fork members being connected through a joint whereby the fork may be moved from a vertical to a horizontal position, there being interfitting portions on the two members for locking them in either position, a bolt forming a pivot pin for the joint engaging both members and threaded into one of them for moving one of the members laterally with respect to the other to release or engage said interfitting portions, and a compression spring about the bolt between said interfitting portions tending to separate them when the bolt is operated to loosen the joint.

3. A retractable support for trailers comprising cooperating bracket and fork members, the bracket member being adapted for attachment to a trailer, the fork having a wheel mounted therein, one of said members having a laterally projecting boss thereon, the other having a mating socket for the boss in a side face thereof, said boss and socket having interfitting key portions to hold them against relative rotation when the boss and socket are inter-engaged, and a screw for moving one of said members toward or away from the other to effect the engagement or disengagement of the boss and socket.

4. A retractable support for trailers comprising cooperating bracket and fork members, the bracket member being adapted for attachment to a trailer, the fork having a wheel mounted therein, one of said members having a boss thereon, the other having a mating socket for the boss, said boss and socket having interfitting key portions to hold them against relative rotation when the boss and socket are inter-engaged, and a screw for moving one of said members toward or away from the other, the interfitting key portions being effective at 90° positions for locking the parts in either vertical or horizontal position.

5. A retractable support for trailers comprising cooperating bracket and fork members, the bracket being adapted for attachment to the under side of a trailer, the fork member having an upper part and a forked part which is swivelly mounted in the upper part, the fork part being curved and carrying a wheel at its free end, the upper part on the fork member cooperating with the bracket, one of said members having a boss with a crenelated surface forming keys which are 90° apart, the other member having a correspondingly shaped socket for mating with the boss, and a bolt passing through the upper part of the fork member and threaded into the bracket member pivotally connecting the two members and for moving one member laterally with respect to the other to engage or disengage the boss and socket, the bolt being centrally positioned with respect to the boss and socket.

FRED R. KLAUS, Sr.